(12) United States Patent
Lee

(10) Patent No.: US 7,379,054 B2
(45) Date of Patent: May 27, 2008

(54) LCD AND TOUCH-CONTROL METHOD THEREOF

(75) Inventor: Yu-Tuan Lee, Taipei (TW)

(73) Assignee: Gigno Technology Co., Ltd., Taipei (TW)

( * ) Notice: Subject to any disclaimer, the term of this patent is extended or adjusted under 35 U.S.C. 154(b) by 431 days.

(21) Appl. No.: 10/620,455

(22) Filed: Jul. 17, 2003

(65) Prior Publication Data

US 2004/0150629 A1  Aug. 5, 2004

(30) Foreign Application Priority Data

Jul. 18, 2002  (TW) .............................. 91116058 A

(51) Int. Cl.
G06F 3/041  (2006.01)
G06F 3/044  (2006.01)
G09G 3/36  (2006.01)
G08C 21/00  (2006.01)

(52) U.S. Cl. .................... 345/173; 345/104; 178/18.06

(58) Field of Classification Search ........ 345/173–178, 345/104; 178/18.01–18.11; 200/512–517; 340/407.1–407.2
See application file for complete search history.

(56) References Cited

U.S. PATENT DOCUMENTS

| | | | | |
|---|---|---|---|---|
| 4,910,504 A | * | 3/1990 | Eriksson .................... | 345/174 |
| 5,270,711 A | * | 12/1993 | Knapp ......................... | 341/34 |
| 5,528,267 A | * | 6/1996 | Ise .............................. | 345/174 |
| 5,642,134 A | * | 6/1997 | Ikeda ......................... | 345/174 |
| 6,239,788 B1 | * | 5/2001 | Nohno et al. ............... | 345/173 |

* cited by examiner

Primary Examiner—Amr A. Awad
Assistant Examiner—Stephen G. Sherman
(74) Attorney, Agent, or Firm—Birch, Stewart, Kolasch & Birch, LLP

(57) ABSTRACT

A touch-control method of an LCD is provided. During the idling time in-between the writing periods, the first touch-position sensing step detects the values of liquid crystal capacitances formed between the scan lines and the counter electrode, and detects a scan-line-direction touch position (Y) according to the values of the liquid crystal capacitances formed between the scan lines and the counter electrode. The charging step charges a voltage signal into each of the data lines needed to be detected after the scan-line-direction touch position (Y) is detected. After the voltage signal is charged, the second touch-position sensing step detects the values of liquid crystal capacitance formed between the data lines and the counter electrode, and detects a data-line-direction touch position (X) according to the values of the liquid crystal capacitance formed between the data lines and the counter electrode.

28 Claims, 10 Drawing Sheets

LCD AND TOUCH-CONTROL METHOD THEREOF

BACKGROUND OF THE INVENTION

1. Field of the Invention

The invention relates to a display and a touch-control method thereof, and in particular, to an LCD (liquid crystal display) and a touch-control method thereof.

2. Description of the Related Art

Regarding conventional touch panel technologies, capacitive touch panels, touch-pen touch panels, resistive touch panels, and the like are mainly involved. In such cases, the capacitive touch panels utilize the human body static electricity for sensing, and are mainly employed in ATMs (automated teller machines) or stock exchange systems. The touch-pen touch panel is an extension of the above-mentioned capacitive touch panel, and can sense a hand or a specific touch-pen. The sensing mode of the touch-pen touch panel can be set as a finger only mode, a pen only mode, or both. The resistive touch panel senses the touch point by sensing pressure, so that there is no limitation to the materials of the touching media, which can be used with the resistive touch panel. In general, the resistive touch panel has a top-sheet, which is made of polyatomic lipid material. A transparent electro conductive layer is formed on the inner surface of the top-sheet, which is kept by a distance with a glass sheet having another transparent electro conductive layer on its surface. Accordingly, when the top-sheet is charged with a current and is touched, the transparent electro conductive layer on the polyatomic lipid material contacts the transparent electro conductive layer on the glass, so that the charged current flows through the transparent electro conductive layer on the glass to the corners of the touch panel. A controller then retrieves the current values from the corners so as to calculate the coordinates of the touch point.

Considering the above-mentioned touch-control technologies, although they offer their own advantages, they also share the same drawbacks, which are described in the following:

All of the above-mentioned touch-control technologies require an additional touch plate, a controller, and the like on a conventional screen or panel such as an LCD or CRT display, so that the display can be equipped with a touch-control function. In other words, the present display with a touch-control function actually includes a display panel and an additional touch-control device so as to carry out the touch-control function, as the display panel itself does not provide the touch-control function.

Since the touch-control device such as the touch plate is not an integral part of the display, to achieve the accuracy of the screen coordination, it must be carefully calibrated.

Moreover, since the touch-control device such as a touch plate is not an integral part of the display, it may partially block the light intensity of the display, so that the brightness of the entire display is reduced.

Furthermore, since the touch-control device such as the touch plate is not an integral part of the display, the manufacturing cost thereof is increased.

Therefore, it is a subjective of the invention to provide a display, which does not require an additional touch plate, does not affect the brightness of the display, has lower manufacturing cost, and has accurate coordination of the screen without requiring adjustment.

SUMMARY OF THE INVENTION

It is therefore an objective of the invention to provide a touch-control method of an LCD, which has a touch-control function without the additional touch plate.

It is another objective of the invention to provide an LCD, which has a touch-control function without the additional touch plate.

In one aspect of the invention, the values of liquid crystal capacitances $C_1$~$C_M$ formed between the scan lines and a counter electrode (or opposite electrode) of an LCD, which has the typical LCD structure, are detected during the idling time in-between writing periods, in which each of the scan lines turns on sequentially to write image data signal into the LCD screen. In this case, the idling time in-between writing periods means that all transistors corresponding to all scan lines are turned off. Thus, the invention can determine whether the LCD screen is touched or not according to the values of the liquid crystal capacitances $C_1$~$C_M$ formed between the scan lines and the counter electrode. When the LCD screen is touched and detected as above, a voltage signal is charged to each of the data lines, and the values of liquid crystal capacitances $C_1$~$C_N$ formed between the data lines and the counter electrode are then detected. Subsequently, the position of the touch point on the LCD screen can be detected according to the liquid crystal capacitances $C_1$~$C_M$ formed between the scan lines and the counter electrode and the liquid crystal capacitances $C_1$~$C_N$ formed between the data lines and the counter electrode, thus obtaining the touch-control function.

It is another aspect of the invention to provide an LCD, which includes a first sensing circuit, a timing control circuit, a voltage-signal generating circuit, and a second sensing circuit. The first sensing circuit detects the liquid crystal capacitances formed between the scan lines and the counter electrode, and detects a scan-line-direction touch position Y according to the liquid crystal capacitances formed between the scan lines and the counter electrode. The timing control circuit controls the first sensing circuit to detect the liquid crystal capacitances formed between the scan lines and the counter electrode during the idling time in-between writing periods, in which each of the scan lines turns on sequentially to write image data signal into the LCD screen. The timing control circuit further controls the voltage-signal generating circuit to charge a voltage signal to the data lines needed to be detected after the scan-line-direction touch position Y is detected. The second sensing circuit detects the values of liquid crystal capacitances formed between the data lines and the counter electrode after the voltage signal is charged, and detects a data-line-direction touch position X according to the liquid crystal capacitances formed between the data lines and the counter electrode.

As mentioned above, since the LCD and touch-control method thereof of the invention directly employ the present TFT-LCD structure, the additional touch plate and controller are unnecessary, and the touch-control method automatically shares the same coordination as the LCD screen without requiring the conventional accurate adjustment. Furthermore, since the additional touch plate is unnecessary, the light intensity of the LCD would not be blocked, so that the brightness of the entire LCD increases. Moreover, since the additional touch plate is unnecessary, the manufacturing cost of the LCD reduces.

BRIEF DESCRIPTION OF THE DRAWINGS

The invention will become more fully understood from the detailed description given in the herein below illustration only, and thus are not limitative of the invention, and wherein.

DETAILED DESCRIPTION OF THE INVENTION

The embodiments of the invention will be described with reference to the accompanying drawings. Before the description of the embodiments, the structure of an LCD will be illustrated with reference to FIG. 1. It should be noted that the following embodiments are described based on a TFT-LCD, and it is to be understood that the invention is not limited to the TFT-LCD.

Figure 1:
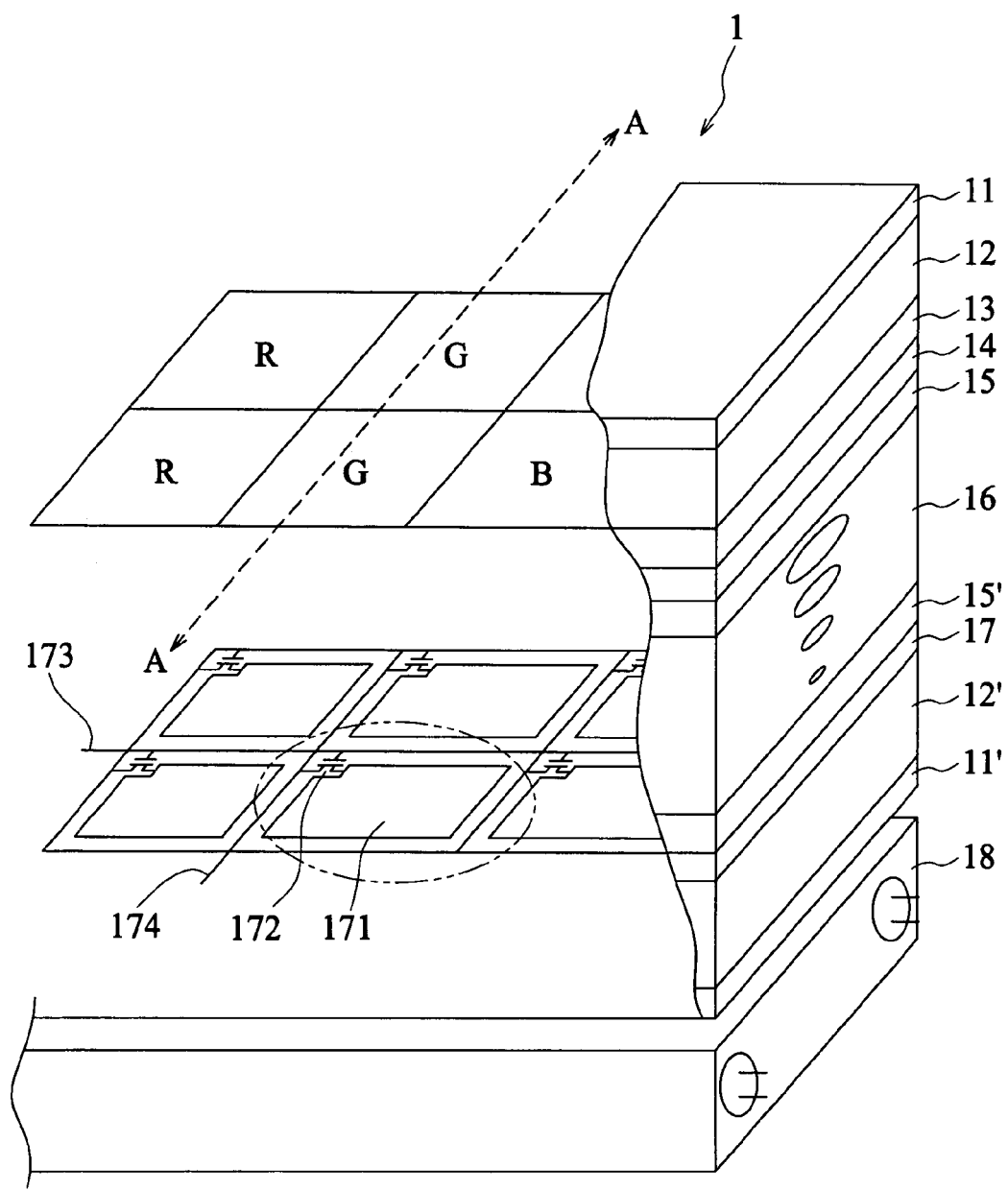
FIG. 1 is a schematic illustration showing the structure of a TFT-LCD.

FIG. 1 shows a general TFT-LCD (Thin-Film-Transistor Liquid-Crystal-Display) 1, which mainly includes two polarizers 11 and 11', two glass substrates 12 and 12', a color filter 13, a counter electrode 14, two orientation layers 15 and 15', a liquid crystal layer 16, a TFT array 17, and a back light source 18. A pixel electrode 171 and a TFT 172 are formed in each pixel area of the TFT array 17, and the TFTs 172 electrically connect to each other through a plurality of scan lines (or gate lines) 173 and data lines (or drain lines) 174.

Figure 2:
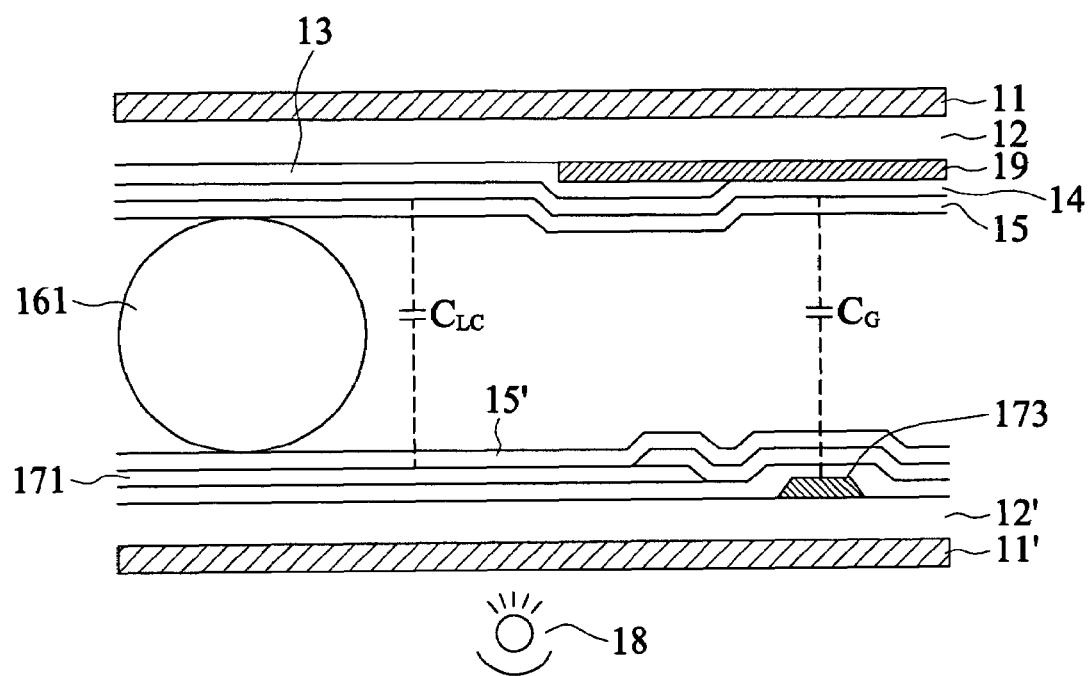
FIG. 2 is a schematic illustration showing a cross sectional view along line A-A shown in FIG. 1.
Figure 3:
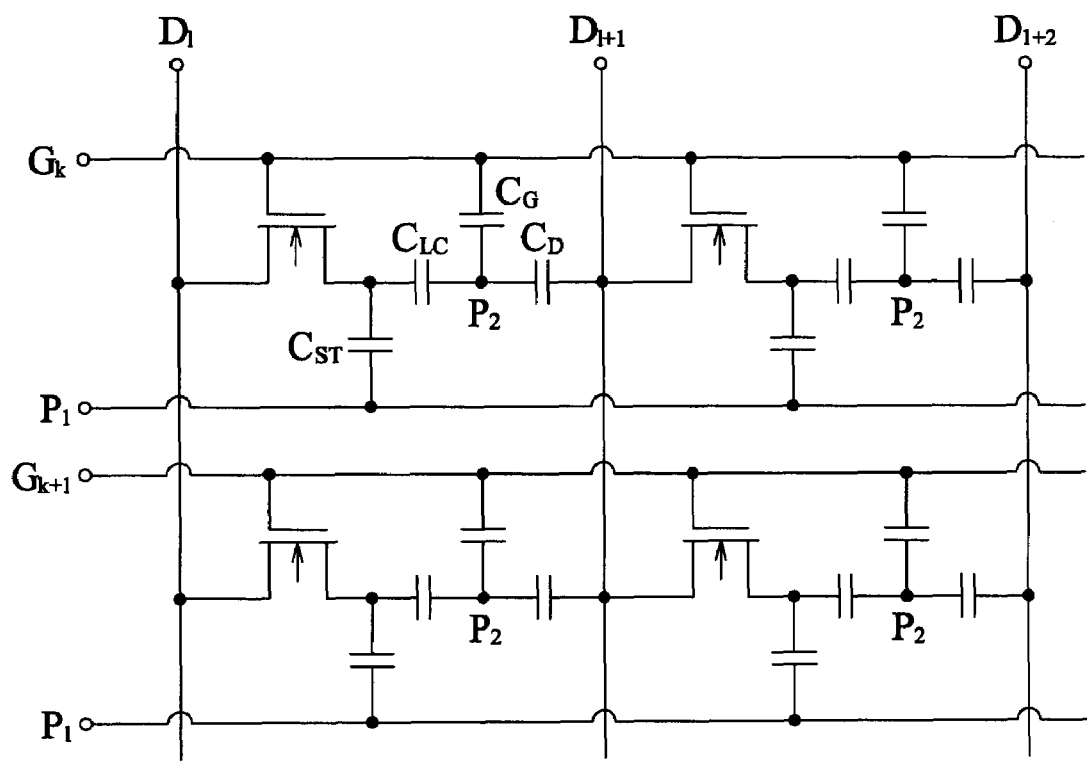
FIG. 3 is a schematic illustration showing an equivalent circuit diagram of a TFT array.

Referring to FIG. 2, the liquid crystal layer 16 includes a plurality of spacer 161, and a black matrix 19 is formed on the bottom of the glass substrate 12. A liquid crystal capacitance $C_{LC}$ is formed between the counter electrode 14 and the pixel electrode 171, and a liquid crystal capacitance $C_G$ is formed between the counter electrode 14 and the scan line 173. There are, of course, more capacitances, other than the liquid crystal capacitance $C_{LC}$ and liquid crystal capacitance $C_G$, existing in the TFT-LCD 1. With reference to FIG. 3, the TFT-LCD 1 further includes storage capacitances $C_{ST}$ for improving the influences from the parasitic capacitances and the current leakages of the liquid crystal capacitances $C_{LC}$, and liquid crystal capacitances $C_D$ formed between the counter electrode 14 and the data lines 174. In this case, the TFT-LCD 1 includes a common electrode $P_1$ of the storage capacitances $C_{ST}$, a counter electrode $P_2$, a plurality of data lines such as the data line $D_1$, and a plurality of scan lines such as the scan line $G_k$.

Figure 4:
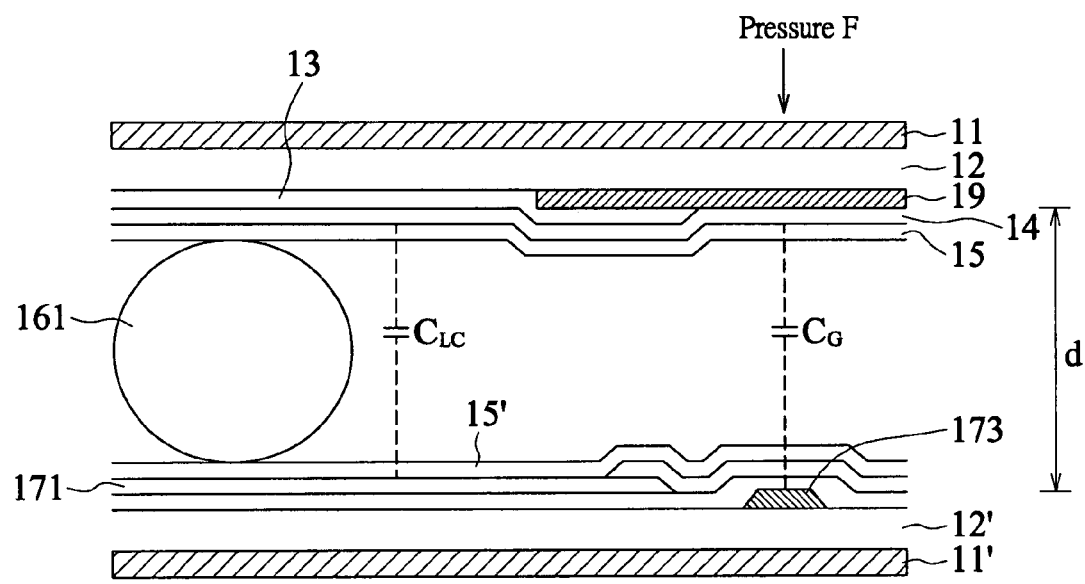
FIG. 4 is a schematic illustration of FIG. 2 showing the structure of a TFT LCD with an external pressure.

With reference to FIG. 4, when a pressure F is applied to the TFT-LCD 1, part of the counter electrode 14 corresponding to the pressure F is indented. In other words, when a user provides the pressure F to the TFT-LCD 1, the distance d between the counter electrode 14 and scan line 173 is reduced. Similarly, the distance between the counter electrode 14 and data line 174 (not shown) is also reduced. Regarding the equation (1) showing the relationship between the capacitance of a pair of parallel conducting plates and the distance thereof, the value of the capacitance is inversely proportional to the distance between two parallel electrodes. In the equation (1), A is the surface area of the electrodes, and $\in$ is a dielectric constant. In this case, when the distance d between the counter electrode 14 and scan line 173 is reduced, or the distance between the counter electrode 14 and data line 174 is reduced, the liquid crystal capacitance $C_G$ or the liquid crystal capacitance $C_D$ increases accordingly. Thus, if the crystal capacitance $C_G$ corresponding to the scan line 173 or the liquid crystal capacitance $C_D$ corresponding to the data line 174 is detected, the position of the touch point can be obtained.

$$C=\in(A/d) \qquad (1)$$

Figure 5:
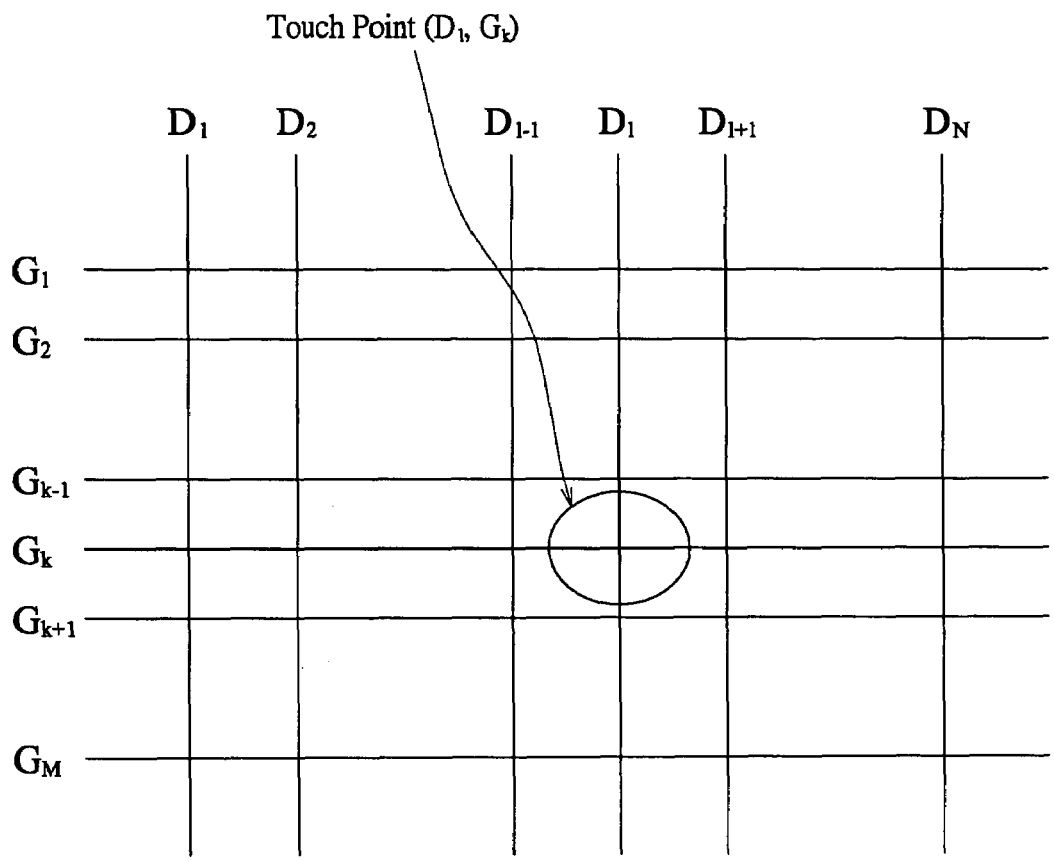
FIG. 5 is a schematic illustration showing the relationship between the data lines and scan lines in the TFT array.

Referring to FIG. 5, when the touch point locates at the intersection of the data line $D_1$ and the scan line $G_k$, the liquid crystal capacitance $C_k$ between the scan line $G_k$ and the counter electrode, and the liquid crystal capacitance $C_1$ between the data line $D_1$ and the counter electrode are increased. In theory, as long as the liquid crystal capacitance $C_k$ and the liquid crystal capacitance $C_1$ are detected, the position of the touch point can then be determined. Since the signal voltage of each of the data lines $D_1 \sim D_N$, however, is determined by the image signal to be displayed, the waveform of each of the data lines $D_1 \sim D_N$ differs from others in general, and the RMS voltage between each of the data lines $D_1 \sim D_N$ and the counter electrode differs from others accordingly. Therefore, since the capacitance of the liquid crystal is dependent on the RMS voltage, the liquid crystal capacitances $C_1 \sim C_N$ corresponding to the data lines $D_1 \sim D_N$ differ from each other even if the pressure F isn't applied. This may cause interference while sensing the touch point according to the liquid crystal capacitances $C_1 \sim C_N$. While by using the touch-control method of an LCD of the invention can solve this problem.

The touch-control method of an LCD of the invention is described in the following with reference to FIG. 6 and FIG. 7.

Figure 6:
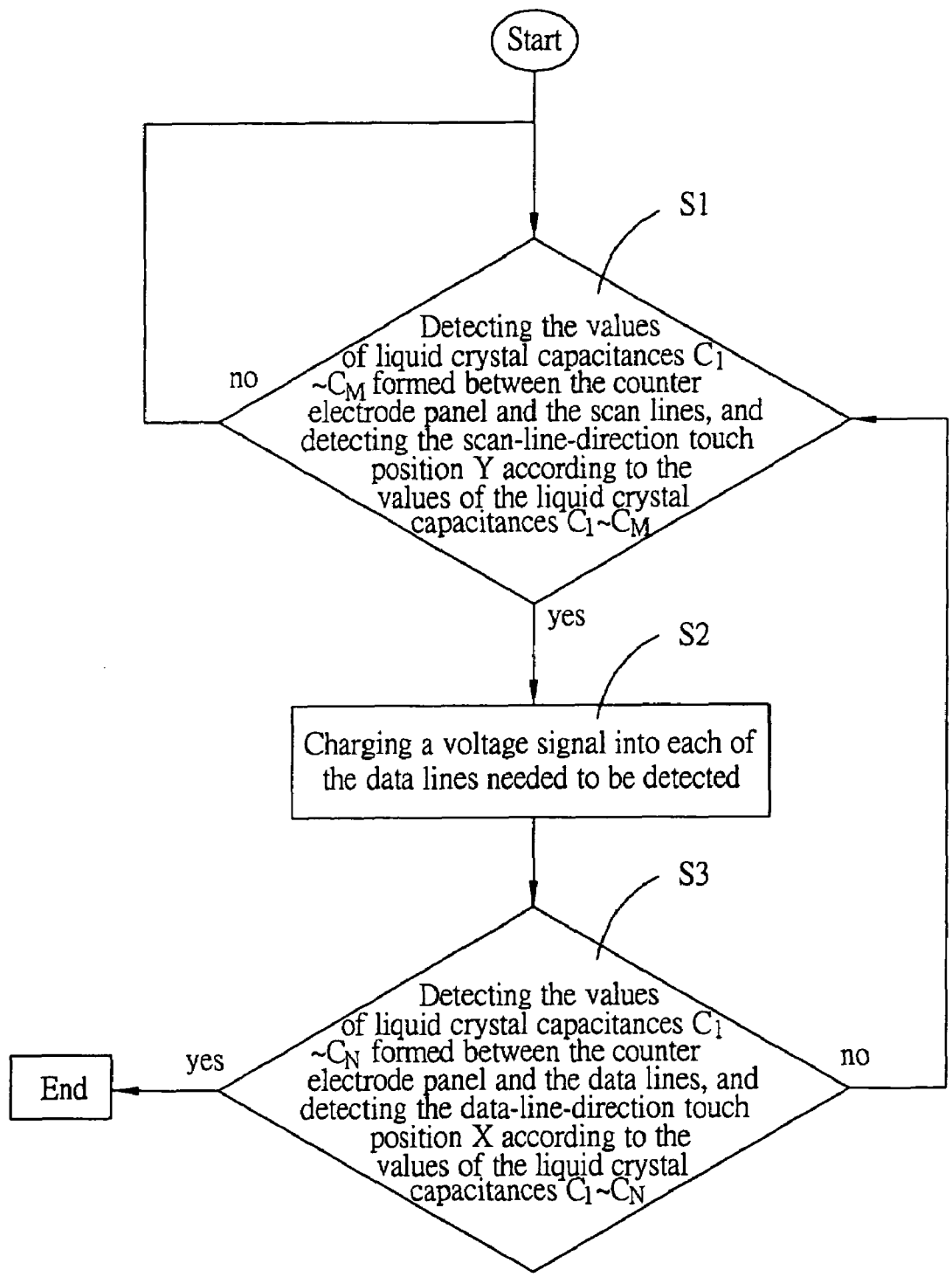
FIG. 6 is a flow chart showing a touch-control method of an LCD according to a preferred embodiment of the invention.

As shown in FIG. 6, the touch-control method of an LCD of the invention includes a first touch-position sensing step S1, a charging step S2, and a second touch-position sensing step S3.

In the first touch-position sensing step S1, the values of liquid crystal capacitances $C_1 \sim C_M$ formed between the counter electrode and the scan lines needed to be detected are detected, respectively, during the idling time in-between writing periods, in which each of the scan lines turns on sequentially to write image data into the LCD screen. Then, a scan-line-direction touch position Y is detected according to the values of the liquid crystal capacitances $C_1 \sim C_M$. In this embodiment, for example, when the value of a liquid crystal capacitance $C_k$, which is one of the liquid crystal capacitances $C_1 \sim C_M$, corresponding to one of the scan lines is greater than a scan-line comparing value, the position of this scan line is determined as the scan-line-direction touch position Y. The scan-line comparing value may be equal to a predetermined value plus the minimum one of the values of the liquid crystal capacitances $C_1 \sim C_M$, or may be equal to a predetermined value plus one of the values of the previously detected liquid crystal capacitances $C_1 \sim C_M$ corresponding to the scan lines which have been previously detected, or may be equal to a predetermined value plus an average of at least two of the liquid crystal capacitances $C_1 \sim C_M$. Of course, the predetermined value may be set to zero. In addition, when the scan-line-direction touch position Y is not detected in the first touch-position sensing step S1, the first touch-position sensing step S1 is repeated. It should be noted that when detecting the liquid crystal capacitances formed between the scan lines and the counter electrode, some of the scan lines can be skipped in the first touch-position sensing step S1, which is depending on the requirement of the application.

In the charging step S2, a voltage signal is charged into each of the data lines needed to be detected after the scan-line-direction touch position Y has been detected. In such a case, the voltage signal causes the RMS voltages between the data lines and the counter electrode to have the same value.

In the second touch-position sensing step S3, the values of liquid crystal capacitances $C_1 \sim C_N$ formed between the counter electrode and the data lines needed to be detected are detected, respectively, after the voltage signal is charged. Then, a data-line-direction touch position X is detected according to the values of the liquid crystal capacitances $C_1 \sim C_N$. In the present embodiment, for example, when the value of a liquid crystal capacitance $C_1$, which is one of the liquid crystal capacitances $C_1 \sim C_N$, corresponding to one of the data lines is greater than a data-line comparing value, the position of this data line is determined as the data-line-direction touch position X. The data-line comparing value may be equal to a predetermined value plus the minimum one of the values of the liquid crystal capacitances $C_1 \sim C_N$, or may be equal to a predetermined value plus one of the values of the previously detected liquid crystal capacitances $C_1 \sim C_N$ corresponding to the data lines which have been previously detected, or may be equal to a predetermined value plus an average of at least two of the liquid crystal capacitances $C_1 \sim C_N$. Of course, the predetermined value may be set to zero. In addition, when the data-line-direction touch position X is not detected in the second touch-position sensing step S3, the first touch-position sensing step S1 is repeated. It should be noted that when detecting the liquid crystal capacitances formed between the data lines and the counter electrode, some of the data lines can be skipped in the second touch-position sensing step S3, which is depending on the requirement of the application.

Accordingly, the scan-line-direction touch position Y and the data-line-direction touch position X indicate the position of the touch point.

Figure 7:
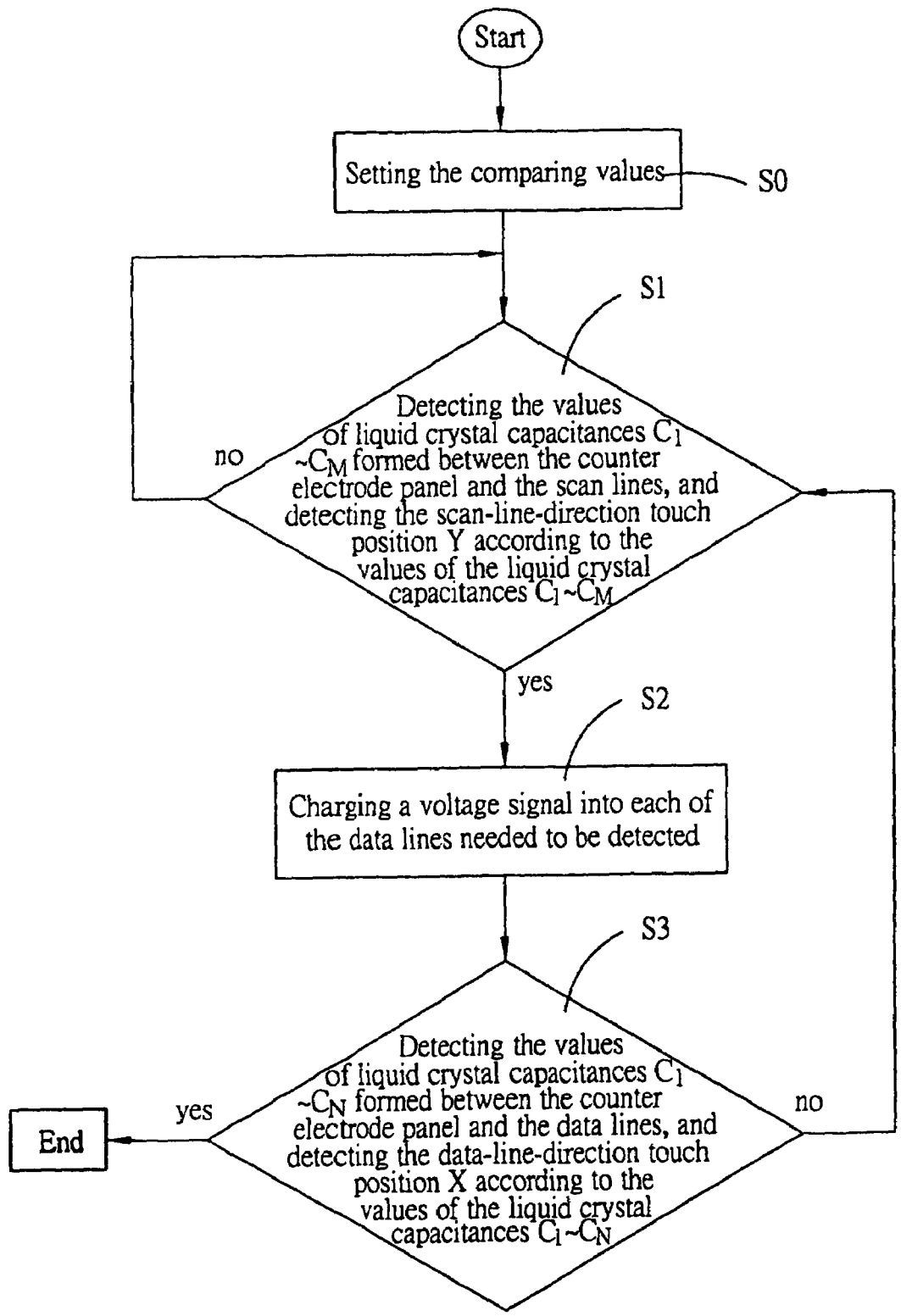
FIG. 7 is a flow chart showing a touch-control method of an LCD according to another preferred embodiment of the invention.

With reference to FIG. 7, the touch-control method of an LCD of the invention further includes a comparing-value setting step S0, which sets at least one scan-line comparing value and at least one data-line comparing value. In the current embodiment, the scan-line comparing value and the data-line comparing value can be set according to practical requirements.

Figure 8:
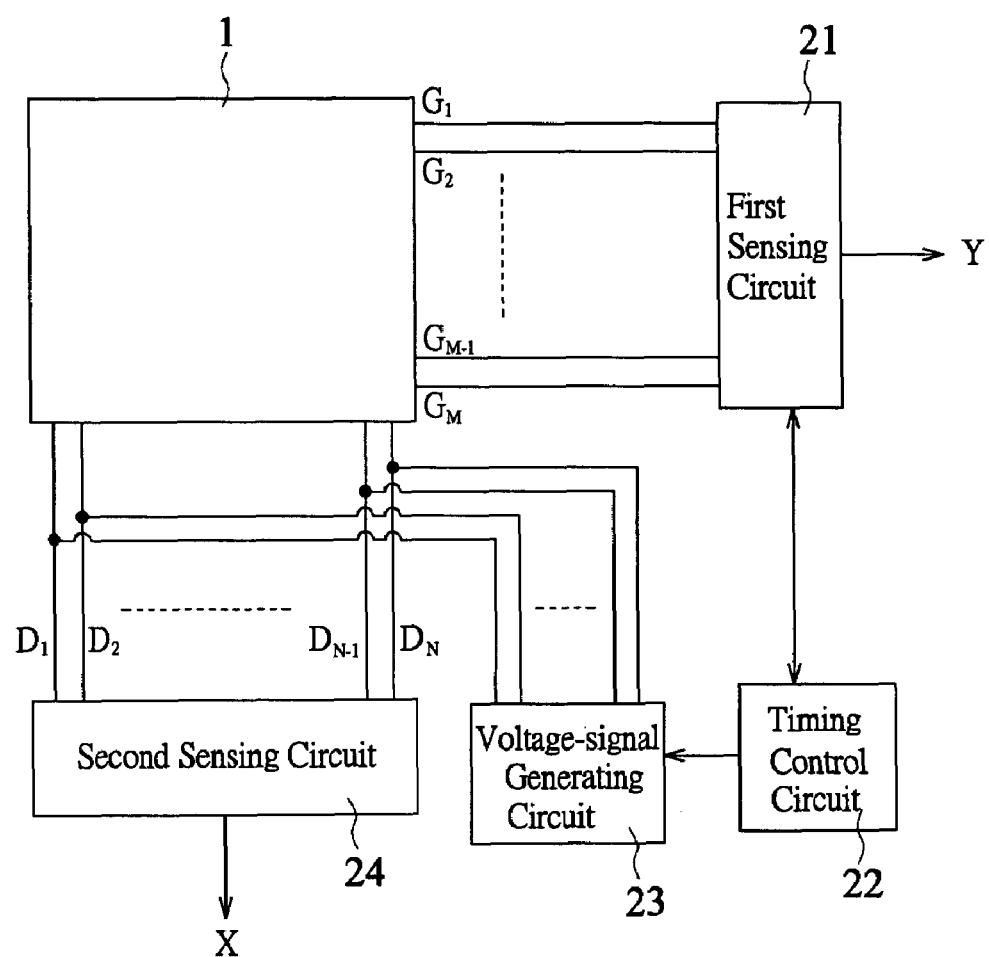
FIG. 8 is a block diagram showing an LCD according to a preferred embodiment of the invention.
Figure 9:
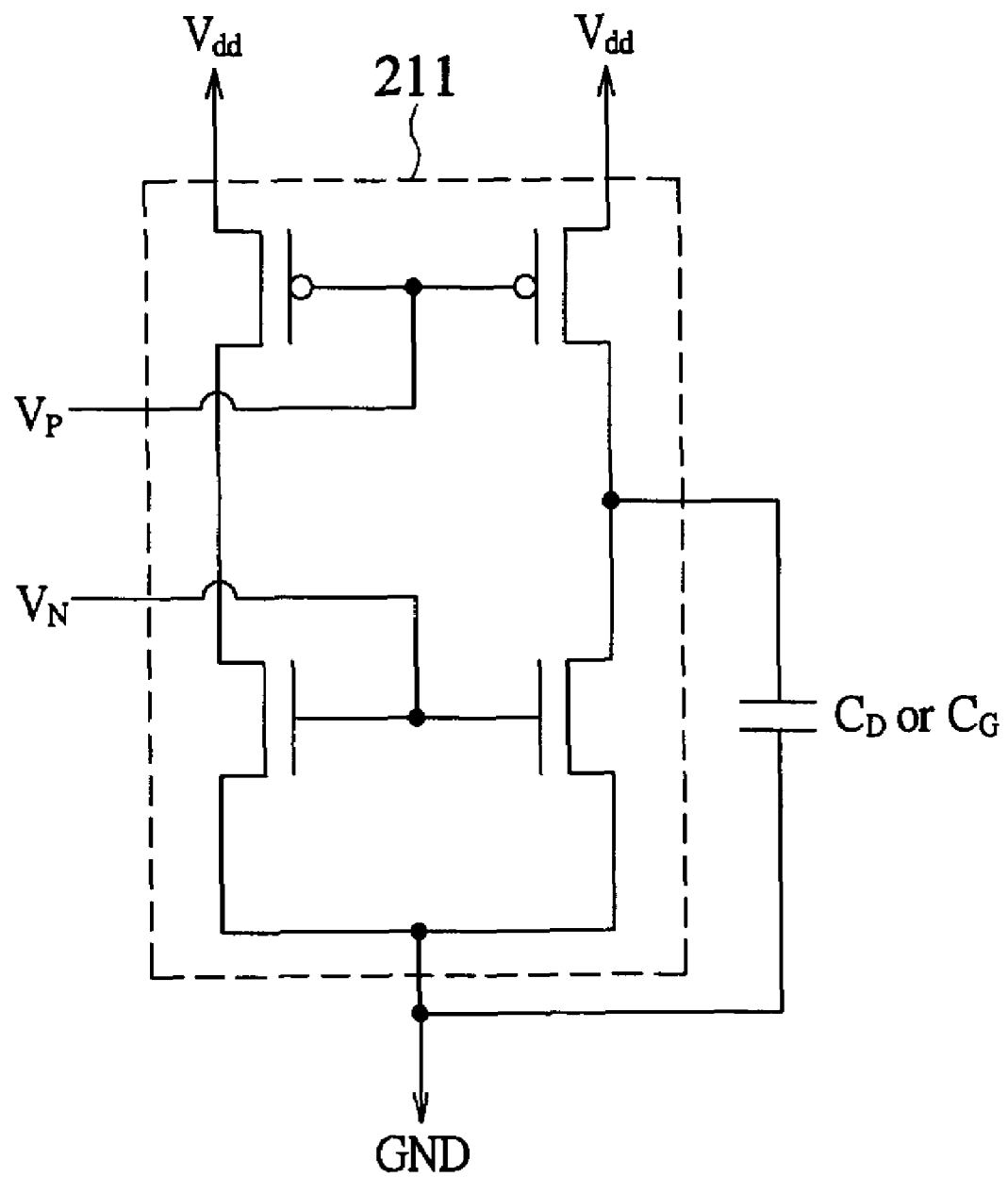
FIG. 9 is a circuit diagram showing a sensing unit, which constructs the sensing circuit.
Figure 10:
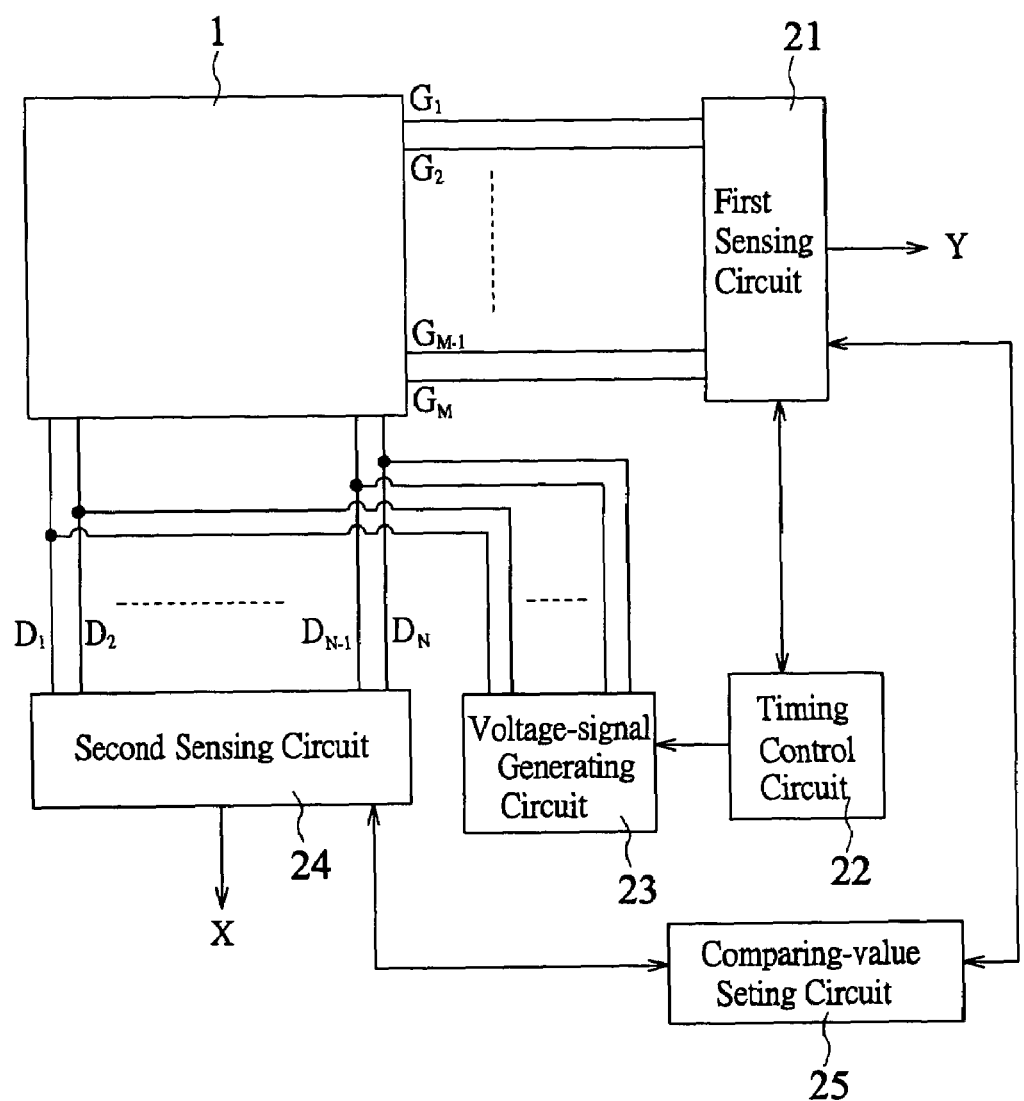
FIG. 10 is a block diagram showing an LCD according to another preferred embodiment of the invention.

Next, please refer to FIG. 8 to FIG. 10, which illustrate an LCD of the invention. To simplify the description, some reference numbers are the same as those mentioned in the prior embodiment. In addition, the touch-control theory is omitted in the following embodiment.

Referring to FIG. 8, an LCD 2 of the invention includes the TFT-LCD 1, and further includes a first sensing circuit 21, a timing control circuit 22, a voltage-signal generating circuit 23, and a second sensing circuit 24.

The first sensing circuit 21 electrically connects to each of the scan lines $G_1 \sim G_M$, respectively, so as to detect each of the liquid crystal capacitances $C_1 \sim C_M$ formed between counter electrode 14 and each of the scan lines $G_1 \sim G_M$. For instance, the liquid crystal capacitance $C_k$, which is one of the liquid crystal capacitances $C_1 \sim C_M$, is formed between the counter electrode 14 and the scan line $G_k$, which is one of the scan lines $G_1 \sim G_M$. Then, the scan-line-direction touch position Y is detected according to each of the liquid crystal capacitances $C_1 \sim C_M$. The method for detecting the scan-line-direction touch position Y is described in the above-mentioned embodiment, and it would not be described again hereinafter. Furthermore, when detecting the liquid crystal capacitances, some of the scan lines $G_1 \sim G_M$ can be skipped.

The timing control circuit 22 electrically connects to the first sensing circuit 21 and controls the first sensing circuit 21 to detect the liquid crystal capacitances $C_1 \sim C_M$ formed between the counter electrode 14 and each of the scan lines $G_1 \sim G_M$ during the idling time in-between writing periods, in which each of the scan lines turns on sequentially to write image data into the LCD screen.

The voltage-signal generating circuit 23 electrically connects to the timing control circuit 22, and each of the data lines. When the scan-line-direction touch position Y is detected, the timing control circuit 22 controls the voltage-signal generating circuit 23 to charge a voltage signal into each of the data lines needed to be detected.

The second sensing circuit 24 electrically connects to each of the data lines needed to be detected, respectively, and detects values of the liquid crystal capacitances $C_1 \sim C_N$ formed between the counter electrode and the data lines needed to be detected after the voltage signal is charged. Then, the data-line-direction touch position X is detected according to the value of each of the liquid crystal capacitances $C_1 \sim C_N$. The method for detecting the data-line-direction touch position X is described in the above-mentioned embodiment, thus its description is omitted in the following. As shown in FIG. 9, the first sensing circuit 21 or the second sensing circuit 24 may consist of a plurality of sensing units 211 and current detection units (not shown). The sensing unit 211 is a CBCM (Charge-Based Capacitance Measurement) circuit structure, which includes two NMOS transistors and two PMOS transistors. One of the NMOS transistors connects to one of the PMOS transistors, while the other NMOS transistor connects to the other PMOS transistor. The capacitance $C_D$ or $C_G$ to be detected electrically connects to the node located between one of the NMOS transistors and the corresponding PMOS transistor. $V_P$ and $V_N$ respectively represent the driving voltages of the PMOS transistors and the NMOS transistors. Thus, by detecting the values of two currents respectively passing through the two set of corresponding NMOS transistor and PMOS transistor, the value of capacitance $C_D$ or $C_G$ to be detected can be determined according to the difference between the values of the two currents.

Furthermore, to make the detection of the scan-line-direction touch position and data-line-direction touch position easier, and to properly control the touch sensitivity of the TFT-LCD, the TFT-LCD according to the embodiment of the invention may further include a comparing-value setting circuit 25 (as shown in FIG. 10) for setting a predetermined comparing value. The comparing-value setting circuit 25 electrically connects to the first sensing circuit 21 and the second sensing circuit 24, respectively, and sets at least one scan-line comparing value and at least one data-line comparing value. The scan-line comparing value and the data-line comparing value are respectively input to the first sensing circuit 21 and the second sensing circuit 24. Thus, the first sensing circuit 21 can compare the values of the liquid crystal capacitances $C_1 \sim C_M$ and the scan-line comparing value, and the second sensing circuit 24 can compare the values of the liquid crystal capacitances $C_1 \sim C_N$ and the data-line comparing value.

In summary, since the LCD of the invention directly employs the existing TFT-LCD structure, the addition of a touch plate and controller as mentioned in the related art are unnecessary, and the LCD screen achieves accurate touch position coordination without requiring the conventional accurate adjustment. Furthermore, since the additional touch plate is unnecessary, the light intensity of the LCD is not blocked thereby, thus the brightness of the entire LCD is increased. Moreover, since the additional touch plate is unnecessary, the manufacturing cost of the LCD is reduced.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A touch-control method of an LCD, which is to sense a touch point on an LCD screen of the LCD when a pressure is applied to the LCD screen, the LCD comprising a counter electrode and a substrate having a plurality of data lines and a plurality of scan lines and a plurality of pixels, wherein the scan lines are connected to a gate of a TFT in each respective pixel, and the data lines are connected to a source of the TFT in each respective pixel, the method comprising:

a first touch-position sensing step, which detects values of liquid crystal capacitances formed between the scan lines needed to be detected and the counter electrode, respectively, and detects a scan-line-direction touch position according to the values of the liquid crystal capacitances formed between the scan lines needed to be detected and the counter electrode during idling time in-between writing periods, each of the scan lines turning on sequentially to write image data into the LCD screen in the writing periods, wherein a part of the counter electrode corresponding to the pressure is indented, the distance between the part of the counter electrode and scan line is reduced, and the distance between the part of the counter electrode and data line is reduced;

a charging step, which charges a voltage signal into each of the data lines needed to be detected after the scan-line-direction touch position is detected; and a second touch-position sensing step, which detects values of liquid crystal capacitances formed between the data lines needed to be detected and the counter electrode, respectively, and detects a data-line-direction touch position according to the values of the liquid crystal capacitances formed between the data lines needed to be detected and the counter electrode after the voltage signal is charged, wherein, the scan-line-direction touch position and the data-line-direction touch position indicate a position of the touch point.

2. The method of claim 1, wherein when the scan-line-direction touch position is not detected in the first touch-position sensing step, the first touch-position sensing step is repeated.

3. The method of claim 1, wherein when the data-line-direction touch position is not detected in the second touch-position sensing step, the first touch-position sensing step is repeated.

4. The method of claim 1, wherein the substrate is a TFT substrate.

5. The method of claim 1, wherein when detecting the liquid crystal capacitances formed between the scan lines and the counter electrode, at least one of the scan lines is skipped in the first touch-position sensing step.

6. The method of claim 1, wherein when detecting the liquid crystal capacitances formed between the data lines and the counter electrode, at least one of the data lines is skipped in the second touch-position sensing step.

7. The method of claim 1, further comprising:

a comparing-value setting step, which sets at least one scan-line comparing value and at least one data-line comparing value.

8. The method of claim 7, wherein when a liquid crystal capacitance ($C_k$) formed between one of the scan lines and the counter electrode is greater than the scan-line comparing value, the first touch-position sensing step determines the location of the scan line corresponding to the liquid crystal capacitance ($C_k$) is the scan-line-direction touch position.

9. The method of claim 7, wherein when a liquid crystal capacitance ($C_1$) formed between one of the data lines and the counter electrode is greater than the data-line comparing value, the second touch-position sensing step determines the location of the data line corresponding to the liquid crystal capacitance ($C_1$) is the data-line-direction touch position.

10. The method of claim 7, wherein the scan-line comparing value is equal to a predetermined value plus a minimum value of the liquid crystal capacitances formed between the scan lines needed to be detected and the counter electrode.

11. The method of claim 7, wherein the data-line comparing value is equal to a predetermined value plus a minimum value of the liquid crystal capacitances formed between the data lines needed to be detected and the counter electrode.

12. The method of claim 7, wherein the scan-line comparing value is equal to a predetermined value plus one of the values of the previously detected liquid crystal capacitances formed between the counter electrode and the scan lines.

13. The method of claim 7, wherein the data-line comparing value is equal to a predetermined value plus one of the values of the previously detected liquid crystal capacitances formed between the counter electrode and the data lines.

14. The method of claim 7, wherein the scan-line comparing value is equal to a predetermined value plus an average of at least two values of the liquid crystal capacitances formed between the scan lines needed to be detected and the counter electrode.

15. The method of claim 7, wherein the data-line comparing value is equal to a predetermined value plus an average of at least two values of the liquid crystal capacitances formed between the data lines needed to be detected and the counter electrode.

16. An LCD (liquid crystal display), which has a counter electrode and a substrate having a plurality of data lines, and a plurality of scan lines and a plurality of pixels, wherein the scan lines are connected to a gate of a TFT in each respective pixel, and the data lines are connected to a source of the TFT in each respective pixel, the LCD comprising:

a first sensing circuit, which respectively electrically connects to the scan lines needed to be detected, detects values of liquid crystal capacitances formed between the scan lines needed to be detected and the counter electrode, and detects a scan-line-direction touch position according to the values of the liquid crystal capacitances formed between the scan lines needed to be detected and the counter electrode, wherein a part of the counter electrode corresponding to a pressure is indented, the distance between the part of the counter electrode and scan line is reduced, and the distance between the part of the counter electrode and data line is reduced;

a timing control circuit, which electrically connects to the first sensing circuit and controls the first sensing circuit to detect the liquid crystal capacitances formed between the scan lines needed to be detected and the counter electrode during idling time in-between writing periods, each of the scan lines turning on sequentially to write image data into the LCD screen in the writing periods;

a voltage-signal generating circuit, which electrically connects to the timing control circuit and each of the data lines, wherein the timing control circuit controls the voltage-signal generating circuit to charge a voltage signal into each of the data lines needed to be detected after the scan-line-direction touch position is detected; and a second sensing circuit, which respectively electrically connects to each of the data lines needed to be detected, detects values of liquid crystal capacitances formed between the data lines needed to be detected and the counter electrode, and detects a data-line-direction touch position according to the values of the liquid crystal capacitances formed between the data lines needed to be detected and the counter electrode after the voltage signal is charged.

17. The LCD of claim 16, wherein when the first sensing circuit detects the liquid crystal capacitances formed between the scan lines needed to be detected and the counter electrode, at least one of the scan lines is skipped.

18. The LCD of claim 16, wherein when the second sensing circuit detects the liquid crystal capacitances formed between the data lines needed to be detected and the counter electrode, at least one of the data lines is skipped.

19. The LCD of claim 16, wherein the substrate is a TFT substrate.

20. The LCD of claim 16, further comprising:
a comparing-value setting circuit, which respectively electrically connects to the first sensing circuit and the second sensing circuit, and sets at least one scan-line comparing value to be input to the first sensing circuit and at least one data-line comparing value to be input to the second sensing circuit.

21. The LCD of claim 20, wherein when a liquid crystal capacitance ($C_k$) formed between one of the scan lines and the counter electrode is greater than the scan-line comparing value, the first sensing circuit determines that the location of the scan line corresponding to the liquid crystal capacitance ($C_k$) is the scan-line-direction touch position.

22. The LCD of claim 20, wherein when a liquid crystal capacitance ($C_1$) formed between one of the data lines and the counter electrode is greater than the data-line comparing value, the second sensing circuit determines that the location of the data line corresponding to the liquid crystal capacitance ($C_1$) is the data-line-direction touch position.

23. The LCD of claim 20, wherein the scan-line comparing value is equal to a predetermined value plus a minimum value of the liquid crystal capacitances formed between the scan lines needed to be detected and the counter electrode.

24. The LCD of claim 20, wherein the data-line comparing value is equal to a predetermined value plus a minimum value of the liquid crystal capacitances formed between the data lines needed to be detected and the counter electrode.

25. The LCD of claim 20, wherein the scan-line comparing value is equal to a predetermined value plus one of the values of the previously detected liquid crystal capacitance formed between the counter electrode and the scan lines.

26. The LCD of claim 20, wherein the data-line comparing value is equal to a predetermined value plus one of the values of the previously detected liquid crystal capacitance formed between the counter electrode and the data lines.

27. The LCD of claim 20, wherein the scan-line comparing value is equal to a predetermined value plus an average of at least two values of the liquid crystal capacitances formed between the scan lines needed to be detected and the counter electrode.

28. The LCD of claim 20, wherein the data line comparing value is equal to a predetermined value plus an average of at least two values of the liquid crystal capacitances formed between the data lines needed to be detected and the counter electrode.

* * * * *